US012741821B2

(12) United States Patent
Gantzer

(10) Patent No.: US 12,741,821 B2
(45) Date of Patent: Sep. 22, 2026

(54) BELT TENSIONING SYSTEM

(71) Applicant: KUHN SAS, Saverne (FR)

(72) Inventor: Christian Gantzer, Woustwiller (FR)

(73) Assignee: KUHN SAS, Saverne (FR)

( * ) Notice: Subject to any disclaimer, the term of this patent is extended or adjusted under 35 U.S.C. 154(b) by 399 days.

(21) Appl. No.: 18/495,827

(22) Filed: Oct. 27, 2023

(65) Prior Publication Data

US 2024/0147905 A1 May 9, 2024

(30) Foreign Application Priority Data

Nov. 3, 2022 (FR) ..................................... 22 11450

(51) Int. Cl.

*B65G 23/44* (2006.01)
*A01D 61/00* (2006.01)
*F15B 1/04* (2006.01)
*F15B 13/02* (2006.01)
*A01D 61/02* (2006.01)
*A01D 78/02* (2006.01)

(52) U.S. Cl.

CPC .......... *B65G 23/44* (2013.01); *A01D 61/006* (2013.01); *F15B 1/04* (2013.01); *F15B 13/02* (2013.01); *A01D 61/02* (2013.01); *A01D 78/02* (2013.01)

(58) Field of Classification Search

CPC . F15B 13/02; F15B 1/04; B65G 23/44; A01D 78/02; A01D 61/02; A01D 61/006; A01D 57/20

See application file for complete search history.

(56) References Cited

U.S. PATENT DOCUMENTS 2,527,452 A * 10/1950 Rose ...................... B65G 23/44 60/426
2,785,789 A * 3/1957 Slomer .................. B65G 23/44 198/813

(Continued)

FOREIGN PATENT DOCUMENTS

EP 1057399 A2 * 12/2000 ............. B65G 23/44
EP 2 842 409 A1 3/2015

OTHER PUBLICATIONS

Preliminary French Search Report issued Jun. 22, 2023 in French Application 22 11450 filed on Nov. 3, 2022, 8 pages (with English Translation of Categories of Cited Documents & Written Opinion).

*Primary Examiner* — Arpad Fabian-Kovacs
(74) *Attorney, Agent, or Firm* — Oblon, McClelland, Maier & Neustadt, L.L.P.

(57) ABSTRACT

An agricultural machine includes a processing unit equipped with an endless belt conveyor and being able to take up a work position in which the conveyor makes it possible to move a product, the movement of the belt being guided by at least two rollers guided in rotation about longitudinal axes; a tensioning system associated with the belt and including an energy accumulator and a tensioning cylinder making it possible to make the distance between the longitudinal axes vary; a regulating system associated with the belt, which prevents, in the work position of the processing unit, oil from flowing from a first pipe connecting the regulating system to a hydraulic control valve, to a second pipe connecting the regulating system to the tensioning cylinder, when the pressure in the second pipe is greater than a maximum value.

9 Claims, 4 Drawing Sheets

(56) References Cited

U.S. PATENT DOCUMENTS

| | | | | |
|---|---|---|---|---|
| 4,079,834 | A * | 3/1978 | Fletcher, Jr | B65G 23/44 226/25 |
| 4,421,228 | A * | 12/1983 | Marsiglio | B65H 23/02 198/840 |
| 5,030,173 | A * | 7/1991 | Bryant | B65G 23/44 474/138 |
| 5,632,372 | A * | 5/1997 | Steinbuchel, IV | B65G 23/44 198/813 |
| 5,899,321 | A * | 5/1999 | El-Ibiary | B65G 39/16 198/810.04 |
| 6,695,130 | B1 * | 2/2004 | Blaylock | B65G 23/44 198/813 |
| 7,448,491 | B1 * | 11/2008 | Tippery | A01D 57/20 198/813 |
| 11,839,176 | B2 * | 12/2023 | Isaac | A01D 61/008 |
| 2002/0008000 | A1 * | 1/2002 | Lutz | B65G 21/06 198/339.1 |
| 2003/0015405 | A1 * | 1/2003 | Buhne | B65G 23/44 198/813 |
| 2008/0296131 | A1 | 12/2008 | Tippery et al. | |
| 2013/0092512 | A1 * | 4/2013 | Buschmann | B65G 39/16 198/839 |
| 2017/0215342 | A1 | 8/2017 | Allochis | |

* cited by examiner 6
10
39
7,19
33
40
13
9
37
34
11
30
21
32
38
31
47
17
18
P
R 19
42
13
9
5
7
7
10
34
11
30
33
36
44
32
46
21
38
31
19
7
7
42
13
9
6
10
34
11
33
36
44
45
32
30
46
45
21
38
31
31
43
43
47
17
18
P
R 3
14
4
35
1
5
8'
12'
16
A
12
2
8

8'
16
23
28
29
24
8
31
27
21
10
9

1
22
42
42
A
35
14
7
5
28
4
7
3

BELT TENSIONING SYSTEM

BACKGROUND OF THE INVENTION

Field of the Invention

The present invention relates to the field of agricultural machinery and in particular to agricultural machines including at least one belt conveyor for moving a product. Its object is a machine of the aforementioned type with a conveyor having an improved belt tensioning means.

Description of the Related Art

Belt conveyors, mounted on belt windrowers or mowers for example, make it possible to move product in order to deposit it in the form of windrows. These windrows are arranged longitudinally to the direction of advance of the machine, so that they can easily be picked up by a harvesting machine, such as for example a baler or a forage harvester.

The belt is said to be endless because it forms a closed loop. It is wound around at least two rollers. Generally, one of the rollers is a driving roller. One or more other rollers can be follower rollers. In order to drive the belt, respectively to ensure that there is sufficient adhesion between the rollers and the belt, the belt must be taut. The belt tension can be adjusted in particular by modifying the distance between two rollers, respectively by increasing or decreasing the distance between the longitudinal axes of two rollers. Insufficient belt tension increases the risk of the belt rubbing against the parts located underneath, especially the parts located near the middle, which is the most cantilevered region. Insufficient tension is also likely to cause the belt to slip on at least one of the rollers.

The invention relates more precisely to an agricultural harvesting machine intended to be moved in a direction of advance, this machine comprising at least one processing unit with at least one conveyor equipped with an endless belt, the processing unit being able to take up a work position, in which the or each conveyor makes it possible to move a product, the movement of the belt being guided by at least two rollers, each one being guided in rotation about a respective longitudinal axis. A tensioning system is associated with the or each belt and comprises an energy accumulator and a tensioning cylinder making it possible to vary the distance between the longitudinal axes.

A machine as described above is disclosed in document US20170215342. In its variant shown on FIG. 9, the belt tensioning system of this machine comprises tensioning cylinders, for each of which the tensioning chamber to be supplied to tension the respective belt is connected to an energy accumulator. In addition, the release chamber of each tensioning cylinder to be supplied to slacken the respective belt, operates in closed circuit in the work position. However, as the oil contained in this release chamber cannot be compressed, it cannot escape of it in the work position. However, sometimes the belt expands rapidly due to a large temperature increase during a day, and/or more slowly due to aging. Consequently, if the belt of such a machine expands, the or each tensioning cylinder cannot extend. Expansion of the belt, for whatever reason, therefore results in a reduced belt tension which can lead to a loss of adhesion of the belt on the rollers, or even slipping of the belt on the rollers.

This loss of adhesion may be progressive: the belt will first tend to slip in an incidental manner, without this being visible. It is only when the belt slips a lot (or is no longer driven at all) that the user is likely to become aware of the problem. The fact that the belt slips, even occasionally, increases the risk of product jamming on the conveyor and results in a less regular windrow, which can cause complications for the windrow harvesting machine. It is therefore necessary to check regularly that the belt is sufficiently taut. In practice, experience has shown that users often do not bother making these regular checks. In addition, if the belt slips on a roller, it will wear out more rapidly.

Another drawback of the hydraulic circuit shown on FIG. 9 of document US20170215342 is that, regardless of the position of the 3-3 hydraulic control valve, the pump delivers oil constantly. Apart from being unnecessary and using the pump more than required, continuous pumping of the oil is not economical and results in an excess fuel consumption over the entire duration of the farming operation. Lastly, oil that is continuously circulated by a pump tends to heat up, which may impair its properties and reduce the machine efficiency.

According to the embodiment variants shown on FIGS. 10 and 11 of document US20170215342, in the work position of the machine, to tension the respective belt, each of the chambers of the tensioning cylinders is connected to an additional energy accumulator so that the tension of the belt(s) remains constant, even after expansion. In addition, a constant oil supply is not required, at least not in the work position. Document US20170215342 thus makes it possible, through the embodiment variants shown on FIGS. 10 and 11, to ensure a belt tensioning system with lower energy consumption. A major drawback of these embodiments is, however, the number of hydraulic components required, more specifically the number of accumulators and cylinders, including double-acting cylinders, and consequently the number of hydraulic connections. Such a hydraulic circuit is complex and incurs significant purchase, use and maintenance costs. Lastly, energy accumulators are subject to special rules when transported in containers, thereby increasing the cost of transporting such a machine.

A machine as described above is also known in document EP 2 845 409 A1. With the regulating system of this document, when the 2-2 control valve is actuated, the tensioning cylinder is not necessarily connected to the pump, even if the pressure in the cylinder is insufficient, such that the risks of insufficient belt tension and of the belt slipping on the rollers are greater than with the regulating system according to the invention.

BRIEF SUMMARY OF THE INVENTION

The present invention is intended to overcome at least one of the drawbacks of the aforementioned known solution.

Thus, its object is a machine of the type mentioned in the introduction, characterized in that it comprises a hydraulic regulating system which prevents, at least in the work position of the processing unit concerned, oil from flowing from a first pipe connecting the regulating system to a hydraulic control valve, to a second pipe connecting the regulating system to the tensioning cylinder, when the pressure in the second pipe is greater than a maximum value, the regulating system allowing oil to flow from the first pipe to the second pipe when the pressure in the second pipe is less than the maximum value, and in that the accumulator is connected to the second pipe.

BRIEF DESCRIPTION OF THE SEVERAL VIEWS OF THE DRAWINGS

The invention will be better understood from the following description, which refers to a preferred embodiment given as a non-limiting example and explained with reference to the attached schematic drawings, in which.

DETAILED DESCRIPTION OF THE INVENTION

Figures 1, 2A:
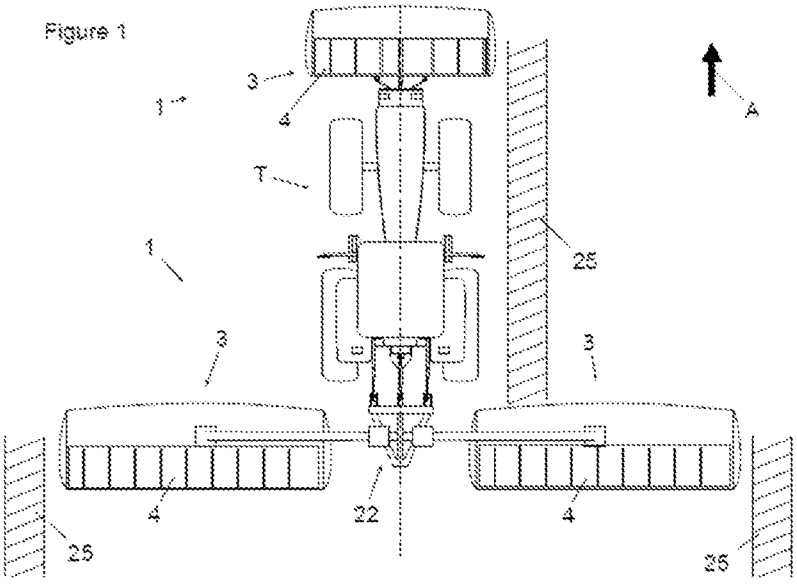
FIG. 1 shows two examples of agricultural machines covered by the invention, a first machine comprising two processing units and being coupled to the rear of a tractor, and a second machine coupled to the front of the tractor.
FIG. 2*a* is a diagrammatic representation of a hydraulic circuit of a machine according to the invention, this circuit being connected to the hydraulic circuit of a tractor, the machine comprising a processing unit in the work position (control valve in the floating position)

FIG. 1 shows two agricultural harvesting machines (1) coupled to a tractor (T). Each agricultural machine (1) is intended to be moved in a direction of advance (A). Each machine (1) comprises at least one processing unit (3). Each processing unit (3) is equipped with at least one endless belt (5) conveyor (4). The (or each) processing unit (3) can take up a work position in which the or each conveyor (4) makes it possible to move a product. Generally, the product is a bulk plant product, such as straw or cut grass. The movement of the belt (5) is guided by at least two rollers (8, 8'). At least during this movement, the belt (5) forms an orbit. Each roller (8, 8') is guided in rotation about a respective longitudinal axis (12, 12').

A tensioning system (6) is associated with the (or each) belt (5). The tensioning system (6) comprises at least one energy accumulator (21). The accumulator (21) is preferably a container in which the volume of oil contained may vary. It is preferably hydropneumatic. The tensioning system (6) also comprises (at least) one tensioning cylinder (9) making it possible to vary the distance between the longitudinal axes (12, 12'). The tensioning cylinder (9) has a tensioning chamber (13). To tension the respective belt (5), the tensioning chamber (13) is supplied with oil. When the tensioning chamber (13) is supplied with oil, for example when it is connected to a pump (P), the tensioning cylinder (9) moves the longitudinal axes (12, 12') of the respective rollers (8, 8') away from each other, preferably by extending.

The agricultural machine (1) is preferably intended to be coupled to an agricultural tractor (T). The tractor (T) makes it possible to move the machine (1) in the direction of advance (A). The machine (1) thus preferably comprises at least one coupling frame intended to be connected to the coupling device of the tractor (T). The coupling device of the tractor (T) can be at the rear or at the front. Preferably, a power take-off of the tractor (T) makes it possible to drive the machine (1), respectively its or each processing unit (3). The machine (1) could, however, be self-propelled.

The machine (1) also comprises a chassis (22). This chassis (22) connects the coupling frame to the or each processing unit (3). The machine (1) also comprises at least one hydraulic circuit (47) for controlling at least some functions. These functions include, for example, tensioning the belt (5), moving the or each processing unit (3) between its work, circulation and/or transport positions, or driving a roller (8) in rotation to set the belt (5) in motion, etc. The tractor (T) also comprises its own hydraulic circuit (18). The hydraulic circuit (18) of the tractor (T) comprises at least one pump (P), one tank (R) and at least one hydraulic control valve (17). The hydraulic circuit (18) of the tractor (T) can be connected to the hydraulic circuit (47) of the machine (1), as shown on FIG. 2. A pump (P), a tank (R) and a control valve (17) may also be included in the hydraulic circuit (47) of the machine (1), particularly in the case of a self-propelled machine (1).

Figure 3:
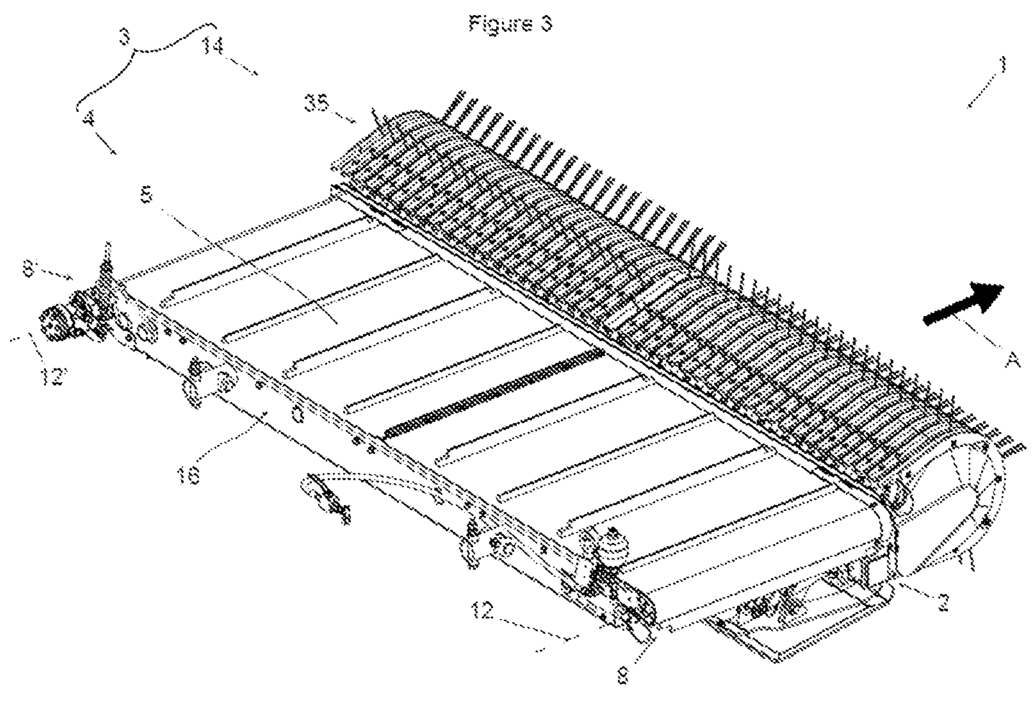
FIG. 3 is a perspective view of a processing unit that may form part of one of the machines shown on FIG. 1 and FIG. 5.

As shown on FIG. 3, the or each processing unit (3) may comprise a harvesting device (14) located, in the work position, in front of the conveyor (4) in the direction of advance (A). The harvesting device (14) moves the product towards the conveyor (4). In the preferred embodiment shown on FIG. 3, the harvesting device (14) is a pickup comprising a drum (35) equipped with raking tines. The drum (35) can be driven in rotation about a substantially horizontal axis that is orthogonal to the direction of advance (A) to pick up the cut product on the ground (S). In an alternative embodiment, the harvesting device (14) is a cutterbar which cuts the product that is still standing before transferring it to the conveyor (4). The machine (1) is thus a mower and/or a belt windrower (5).

According to the invention, a hydraulic regulating system (10) is associated with the or each belt (5), which prevents, at least in the work position of the processing unit (3) concerned, oil from flowing from a first pipe (31) connecting the regulating system (10) to a hydraulic control valve (17) to a second pipe (32) connecting the regulating system (10) to the tensioning cylinder (9), when the pressure in the second pipe (32) is greater than a maximum value. Still according to the invention, the accumulator (21) is connected to the second pipe (32). Thanks to these arrangements, the tensioning system (6) operates in closed circuit as long as the pressure in the second pipe (32) is greater than the maximum value, allowing the accumulator (21) to compensate for both contraction and expansion of the belt (5). The belt (5) is in fact flexible. Its flexibility is affected in particular by temperature. The belt (5) can be made in particular of elastomer and/or rubber.

When the pressure in the second pipe (32) is less than the maximum value, the regulating system (10) allows oil to flow from the first pipe (31) to the second pipe (32). Thus, the pump (P) is only used to tension the belt (5) when necessary, advantageously reducing the energy consumption of the machine (1), and making its use more economical. “If necessary” means if the pressure in the second pipe (32) is less than the maximum value. Also, the oil of the hydraulic circuit (47) of such a machine (1) is less likely to heat up, since it only flows when necessary.

In addition, the hydraulic circuit (47) of the machine (1) is simple to manufacture. The regulating system (10) comprises in fact a limited number of hydraulic components, in particular accumulators and cylinders, thereby advantageously reducing the purchase and maintenance costs of the machine (1). In the preferred embodiment, the or each tensioning system (6) comprises in fact a single accumulator (21).

FIG. 1 shows precisely two agricultural harvesting machines (1). A first machine (1) is mounted at the front of a tractor (T). It is equipped with a single processing unit (3). A second machine (1) is mounted at the rear of the tractor (T). It is equipped with two processing units (3). Each processing unit (3) may comprise one or more endless belt (5) conveyors (4). In the preferred embodiment, each conveyor (4) makes it possible to move the product transversally to the direction of advance (A).

Thanks to the advance of the machine (1) and to the displacement of the product by the conveyor (4) transversally to the direction of advance (A), at least one windrow (25) is formed. The windrow (25) is the product deposited by the machine (1), respectively by the conveyor (4), on the ground (S). The windrow (25) is thus longitudinal to the direction of advance (A). In the work position of the processing unit (3) concerned, driving the belt (5) of the or each conveyor (4) around its respective orbit makes it possible to displace the product. When the belt (5) is guided by only two rollers (8, 8'), the orbit of the respective belt (5) is preferably oblong, seen from one of the longitudinal axes (12, 12'). The or each processing unit (3) may also take up a circulation position in which the conveyor (4) is farther away from the ground (S) than in the work position. At least in the case of a machine (1) to be coupled to the rear of the tractor (T), the processing unit (3) may also take up a transport position, in which its horizontal dimension that is perpendicular to the direction of advance (A) is reduced compared with that in the work position.

To drive the belt (5), at least one of the rollers (8, 8') is a driving roller. A hydraulic motor (26) drives the driving roller (8, 8') in rotation about the respective longitudinal axis (12, 12'). The hydraulic motor (26) thus drives the belt (5). Changing the direction of rotation of the hydraulic motor (26) thus makes it possible to change the direction of movement of the belt (5). Each conveyor (4) can deposit a windrow (25) on either side of the processing unit (3), seen in the direction of advance (A). Depending on the direction of rotation of the belt (5), the windrow (25) can be deposited on either side of the processing unit (3). In the case of a processing unit (3) with two conveyors (4), two windrows (25) can also be deposited, one on each side of the processing unit (3). According to an embodiment variant, the machine (1) can have two processing units (3) or two conveyors (4) that can be moved transversally to the direction of advance (A). A single windrow (25) can then be formed between the two conveyors (4). When the machine (1) is connected to the rear of the tractor (T), the windrow (25) is deposited as required either towards the chassis (22) and/or on the side opposite the chassis (22).

In some applications, the belt (5) can also be guided by three or more rollers (8, 8'). When seen from above and in the work position of the processing unit (3), each longitudinal axis (12, 12') is preferably substantially parallel to the direction of advance (A), maximizing the working width of the conveyor (4).

Figure 2B:
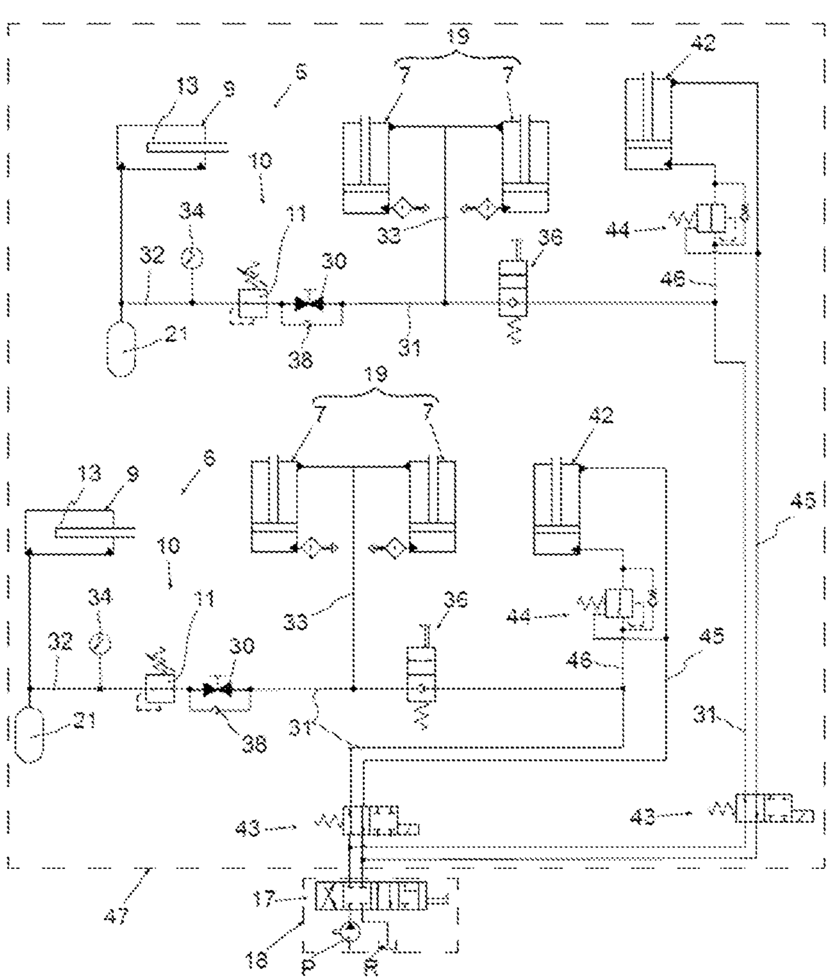
FIG. 2*b* is a diagrammatic representation of a hydraulic circuit of a machine according to the invention comprising two processing units, each one having a cylinder for tensioning the respective belt, the hydraulic circuit of the machine being connected to the hydraulic circuit of a tractor.

As shown on FIGS. 2, the hydraulic control valve (17) makes it possible to connect the first pipe (31) to the pump (P) and/or to the tank (R). Although the second pipe (32) connects the regulating system (10) to the tensioning cylinder (9), it is nevertheless possible that another hydraulic element may be mounted between the regulating system (10) and the tensioning cylinder (9). For example, in an embodiment variant not shown, a non-return valve is mounted on the second pipe (32) between the regulating system (10) and the tensioning cylinder (9). Similarly, hydraulic elements could be mounted on the first pipe (31). Thus, as shown on FIG. 2*b*, the first pipe (31) connects the regulating system (10) to the control valve (17) via a selector valve (43) and a restriction valve (36) (detailed below).

The control valve (17) is, for example, a 3-3 type (with three inlets and three configurations), or a 4-4 type (with four inlets and four configurations). The control valve (17) can take up at least one closed configuration in which it prevents any oil from flowing to the first pipe (31). The control valve (17) can also take up a floating configuration in which it connects the first pipe (31) to the tank (R). The configurations of the control valve (17) can be modified manually, preferably from the cab of the tractor (T).

According to another interesting feature, a hydraulic receiver (19) is associated with the or each belt (5). This hydraulic receiver (19) is connected to the first pipe (31). As shown on FIGS. 2, the hydraulic receiver (19) is preferably connected to the first pipe (31) by a third hydraulic pipe (33). The hydraulic receiver (19) performs a function other than that of the tensioning system (6) of the belt (5). Connecting a hydraulic receiver (19), respectively the third pipe (33), to the first pipe (31) makes it possible to simplify the hydraulic circuit (47) of the machine (1), by reducing the number of pipes and/or the total length of the pipes. This also makes it possible to use a single control valve to perform several functions. The hydraulic receiver (19) thus forms part of the hydraulic circuit (47) of the machine (1).

FIG. 2*a* in particular shows that the second pipe (32) connects at least the tensioning chamber (13) and the regulating system (10). The pressure in the tensioning chamber (13) is the same as the pressure in the second pipe (32). Preferably, the second pipe (32) also connects the regulating system (10) and the accumulator (21). The pressure in the tensioning chamber (13) is also the same as the pressure in the accumulator (21) (oil side). Thanks to the regulating system (10) as proposed above, the pressure in the second pipe (32) is increased up to the maximum value, if necessary, whenever the hydraulic receiver (19) is supplied with oil, respectively whenever the hydraulic receiver (19) is connected to the pump (P). Thus, the belt (5) is re-tensioned, if necessary, whenever the hydraulic receiver (19) is supplied with oil, further reducing the risk of the belt (5) becoming slack. In addition, when the pressure in the second pipe (32) is greater than the maximum value, the hydraulic receiver (19) can be supplied with oil without the second pipe (32) being supplied with oil. The hydraulic receiver (19) can thus be actuated without modifying the tension of the belt (5).

The hydraulic receiver (19) may in particular comprise at least one hydraulic motor and/or at least one hydraulic cylinder. If the hydraulic receiver (19) comprises at least one hydraulic motor that is permanently connected to the pump (P) when the machine (1) is in use, the tension of the belt (5) is increased as soon as the pressure in the second pipe (32) becomes less than the maximum value. This prevents the belt (5) from being slackened in the work position. In an alternative embodiment not shown, the hydraulic receiver (19) consists of the hydraulic motor (26). Preferably, the hydraulic motor (26) makes it possible to drive the respective belt (5) around its orbit. Alternatively, the hydraulic motor (26) makes it possible to drive the cutterbar of the harvesting device (14). The hydraulic motor (26) could also drive at least one wheel of a self-propelled vehicle.

In the preferred embodiment, the hydraulic receiver (19) comprises at least one lift cylinder (7). The lift cylinder (7) makes it possible to move the associated processing unit (3) between its work position and its circulation position. As the lift cylinder (7) is used at least each time the machine (1) is used, the tension of the belt (5) is automatically updated at least before each use, thus reducing the attention that the operator must pay to regularly check the tension of the belt (5). In practice, the or each lift cylinder (7) is used at every U-turn, headland and each time a windrow (25) is crossed as the machine (1) moves forward. Given the frequency at which the belt (5) is then re-tensioned if necessary, it is not necessary to check the tension of the belt (5) visually. A major drawback of the known machines of this type in fact is that the user must regularly check visually that the tension of the belt (5) is sufficient. In addition, the user often forgets to check whether the tension of the belt (5) is sufficient. If the tension of the belt (5) is insufficient, it may also be necessary to re-tension the belt (5), which means that the user wastes even more time.

As shown on FIG. 1, the machine (1) may comprise two processing units (3). As shown on FIG. 5, at least one of the processing units (3) can be moved transversally to the direction of advance (A). Preferably, at least one transverse cylinder (28) is associated with each processing unit (3) and/or conveyor (4), thereby making it possible to move the associated processing unit (3) and/or the associated conveyor (4) transversally, and preferably perpendicularly, to the direction of advance (A). As an alternative or in addition, the hydraulic receiver (19) may comprise a transverse cylinder (28).

When a hydraulic receiver (19) connected to the first pipe (31) is associated with the or a belt (5), when this hydraulic receiver (19) requires the floating configuration of the control valve (17) in the work position of the processing unit (3) concerned, and when the pressure in the second pipe (32) is less than the maximum value, oil can flow from the second pipe (32) to the tank (R), thus causing the belt (5) to slacken. To prevent the belt (5) from slackening in this case, a non-return valve (38) mounted so as to prevent oil from flowing from the respective second pipe (32) to the respective first pipe (31) is associated with the or each belt (5). Thanks to the non-return valve (38), when the hydraulic receiver (19) comprises at least one lift cylinder (7), the processing unit (3) concerned can thus follow the unevenness of the ground (S) without any risk of the belt (5) slackening.

In the preferred embodiment, the regulating system (10) comprises at least one pressure control valve (11). The pressure control valve (11) is arranged so that the regulating system (10) prevents oil from flowing from the first pipe (31) to the second pipe (32) when the pressure in the second pipe (32) is greater than the maximum value. The regulating system (10) thus prevents, at least in the work position of the processing unit (3) concerned, oil from flowing to the second pipe (32) when the pressure in the second pipe (32) is greater than the maximum value. Precisely, the regulating system (10) prevents oil from flowing from the first pipe (31) to the second pipe (32) when the pressure in the tensioning chamber (13) is greater than the maximum value, regardless of the position of the processing unit (3) concerned. In addition, the pressure control valve (11) is arranged so that the regulating system (10) allows oil to flow from the first pipe (31) to the second pipe (32) when the pressure in the second pipe (32) is less than the maximum value. Thanks to the pressure control valve (11), the regulating system (10) also allows, at least in the work position of the processing unit (3) concerned, oil to flow to the tensioning chamber (13) when the pressure in the tensioning chamber (13) is less than the maximum value. The user can therefore tension the belt (5) simply by connecting the first pipe (31) to the pump (P). Preferably, the maximum value can be adjusted using the pressure control valve (11), in order to adapt it to the features of the belt (5), the tensioning cylinder (9) and/or the accumulator (21).

When the pressure in the second pipe (32) is greater than the maximum value, a three-way pressure control valve (11) sends oil from the second pipe (32) to a or the tank (R). With a three-way pressure control valve (11), the maximum value must then be greater than the pressure required to supply the hydraulic receiver (19). Otherwise, the hydraulic receiver (19) cannot be actuated. In addition, if the maximum value is greater than the pressure required to actuate the hydraulic receiver (19), when the hydraulic receiver (19) no longer needs to be supplied with oil and the pressure in the second pipe (32) is greater than the maximum value, then the pump (P) is connected to the tank (R), resulting in higher energy consumption and a risk of the oil heating up. Preferably therefore, a two-way pressure control valve (11) is used. In other words, the pressure control valve (11) is not connected directly to a or the tank (R).

The regulating system (10) may also comprise a pressure limiting valve (40) connected to the or a tank (R) so as to prevent oil from flowing to the second pipe (32) when the pressure in this second pipe (32) is greater than a set value. Such a regulating system (10) ensures that the tension of the belt (5) cannot be such that it would cause a distension of the belt (5). The set value can preferably be adjusted using the pressure limiting valve (40). With a regulating system (10) comprising a pressure limiting valve (40) and no pressure control valve (11), the set value is preferably greater than the pressure required to actuate the hydraulic receiver (19), so that this hydraulic receiver (19) can be actuated.

If the regulating system (10) comprises a pressure limiting valve (40) and a pressure control valve (11), the set value of the pressure limiting valve (40) is preferably greater than the maximum value of the pressure control valve (11), so that the pressure control valve (11) can block the flow of oil from the first pipe (31) to the second pipe (32). If the regulating system (10) comprises a pressure limiting valve (40) and a pressure control valve (11), and the hydraulic circuit (47) of the machine (1) comprises a hydraulic receiver (19), the pressure control valve (11) is preferably mounted between the non-return valve (38) and the pressure limiting valve (40) so that the pressure limiting valve (40) can limit the pressure in the second pipe (32), regardless of the position of the pressure control valve (11).

To simplify the hydraulic circuit (47) of the machine (1), as well as its use, by reducing the number of adjustments, the regulating system (10) preferably does not comprise a pressure limiting valve (40). Also to simplify the hydraulic circuit (47) of the machine (1), the or each regulating system (10) comprises a single pressure control valve (11).

So that the or each belt (5) can slacken, especially in the transport position of the processing unit (3) concerned, a stop valve (30) is mounted in parallel with the or each non-return valve (38). This stop valve (30) is closed in the work position of the process unit (3) concerned. Opening this stop valve (30) makes it possible to release oil from the tensioning system (6), thus slackening the belt (5) and preventing it from deforming under the effect of tension over a long period of time. It is therefore recommended to release some of the pressure in the tensioning cylinder (9) when the processing unit (3) is in the transport position. The stop valve (30) and/or the non-return valve (38) are preferably mounted between the regulating system (10) and the first pipe (31) to ensure that the pressure measured by the pressure control valve (11) and/or the pressure limiting valve (40) is the same as the pressure in the second pipe (32).

Figure 4:
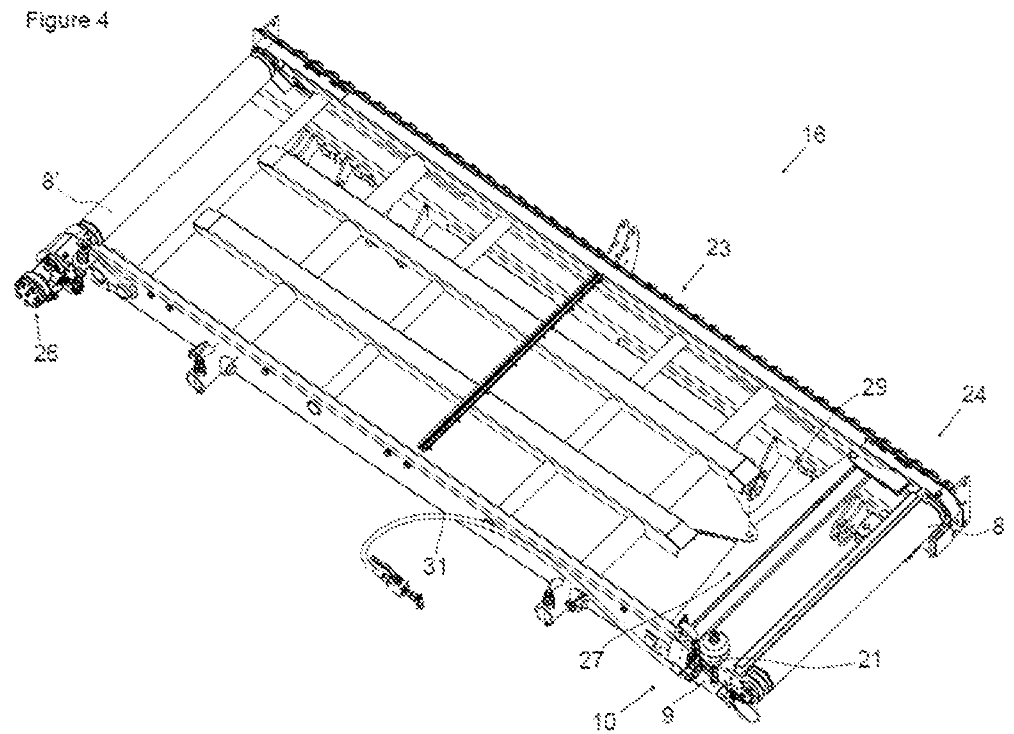
FIG. 4 is a perspective view of a conveyor that may form part of the processing unit shown on FIG. 3, the belt having been masked to show the frame more clearly.

As shown on FIG. 4, each roller (8, 8') is pivotally mounted with a frame (16) about its respective longitudinal axis (12, 12'). The frame (16) is preferably part of the conveyor (4). To adapt to the various distances between the longitudinal axes (12, 12') of the rollers (8, 8'), the frame (16) comprises a main part (23) and a trolley (24). The trolley (24) can be moved relative to the main part (23) transversally to the longitudinal axes (12, 12'). One roller (8, 8') is mounted on the main part (23) and the other roller (8, 8') on the trolley (24). Preferably, a fixed roller (8') is mounted on the main part (23), and a mobile roller (8) on the trolley (24). Preferably, the driving roller (8, 8') that makes it possible to drive the belt (5) around its orbit is the fixed roller (8').

The trolley (24) is guided in translation relative to the main part (23). The trolley (24) is thus mounted so that it can slide relative to the main part (23) parallel to the plane passing through the longitudinal axes (12, 12') of the rollers (8, 8'), thus allowing the distance between the longitudinal axes (12, 12') to be varied. The tensioning cylinder (9) is connected on one hand to the trolley (24) and on the other hand to the main part (23), such that it can modify the distance between the longitudinal axes (12, 12'), respectively between the rollers (8, 8').

Preferably, a cross beam (27) is pivotally mounted with the main part (23) along a main axis (29). The main axis (29) is perpendicular to the plane passing through the longitudinal axes (12, 12') of the rollers (8, 8'). The cross beam (27) is pivotally mounted with the tensioning cylinder (9), preferably along an axis parallel to the main axis (29). In addition, the cross beam (27) is pivotally mounted with the trolley (24), preferably along an axis parallel to the main axis (29). Lastly, the tensioning cylinder (9) is articulated with the trolley (24), preferably along an axis parallel to the main axis (29). The main axis (29) is preferably located substantially in the middle of the width of the conveyor (4), so that the force required by the tensioning cylinder (9) to move the trolley (24) and tension the belt (5) is substantially halved.

Considering the often limited space between the two sides of the belt (5), and to simplify its installation and maintenance, the tensioning cylinder (9) could be located outside the volume delimited by the belt (5). Thus access to the tensioning cylinder (9) is simplified and an oil leak from the hydraulic circuit (47) of the machine (1) is less likely to reduce the adhesion between the belt (5) and the roller(s) (8, 8'), thus preventing the belt (5) from slipping.

The or each tensioning cylinder (9) is preferably of the single-acting type, thereby simplifying the hydraulic circuit (47) of the machine (1). Alternatively, the or each tensioning cylinder (9) is of the double-acting type, the tensioning chamber (13) being connected to the second pipe (32) and the other chamber to the open air via a venting pipe (37). Preferably, the or each tensioning cylinder (9) operates linearly, thus simplifying the kinematics of the machine (1).

Alternatively, the regulating system (10) could comprise an electronic system with a pressure sensor measuring the pressure in the second pipe (32), and this electronic system could make it possible to open and close a valve whenever the pressure in the second pipe (32) becomes less than, respectively greater than, the maximum value. However, such a regulating system (10) would be more complex and more expensive.

Figure 5:
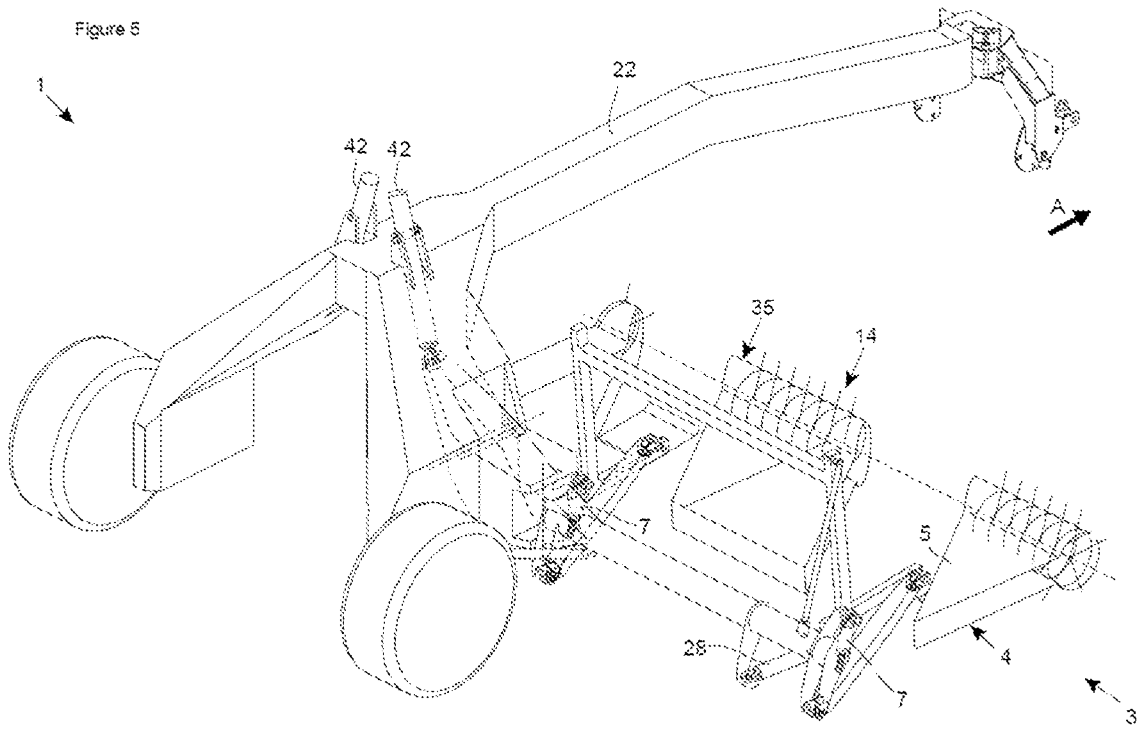
FIG. 5 is a diagrammatic perspective view of a machine according to the invention intended to be mounted at the rear of an agricultural tractor and having two processing units, only one of which being shown.

FIG. 5 shows a machine (1) that may comprise several processing units (3). To direct the processing unit (3) during its movements between the work and circulation positions, preferably substantially parallel to the ground (S), in the preferred embodiment shown on FIG. 2*b*, the hydraulic receiver (19) consists of two lift cylinders (7). Preferably, the lift cylinders (7) are connected in series. In the example shown on FIG. 5, the lift cylinders (7) allow the processing unit (3) to be pivoted about at least one axis that is substantially horizontal and substantially perpendicular to the direction of advance (A), and preferably located at the rear of the associated conveyor (4).

The third hydraulic pipe (33) is preferably connected to a lift chamber (39) of the or each lift cylinder (7). Supplied with oil, the lift chamber (39) makes it possible to move the associated processing unit (3) from its work position to its circulation position. To change from the circulation position to the work position, the weight of the processing unit (3) makes it possible to lower it in the work position. Thus, to change from the circulation position to the work position, the lift chamber (39) of each lift cylinder (7) can simply be connected to the tank (R). It appears from the above that the or each lift cylinder (7) is preferably of the single-acting type, thus simplifying the hydraulic circuit (47) of the machine (1) and reducing its energy consumption.

Preferably, the control valve (17) can also take up a filling configuration in which it makes it possible to connect the pump (P) and the first pipe (31). In the filling configuration, when the hydraulic receiver (19) comprises at least one lift cylinder (7), the control valve (17) makes it possible to move the processing unit (3) between the work and circulation positions. In the circulation position, the control valve (17) is in the closed position in order to hold (in raised position) the processing unit (3).

On the machine (1) shown on FIG. 5, a transport cylinder (42) is associated with the or each processing unit (3), which makes it possible to move the processing unit (3) considered into the transport position. A processing unit (3) can reach its transport position from its work position and/or its circulation position. In this embodiment example, in the transport position, the longitudinal dimension of the processing unit (3) is substantially parallel to the direction of advance (A), and preferably substantially horizontal. However, the transport position can be the same as the circulation position, in particular in case of a front-mounted machine (1) as shown on FIG. 1 at the front of the tractor (T).

As can be seen on FIG. 2*b*, to reduce the number and/or the length of the hydraulic pipes of the machine (1), the or each transport cylinder (42) could be connected to the associated first pipe (31) by a sixth pipe (46). As the transport cylinder (42) is preferably of the double-acting type, a first chamber of the transport cylinder (42) is connected to the first pipe (31) by the sixth pipe (46). The other chamber of the transport cylinder (42) is connected to the control valve (17) by a fifth pipe (45).

In the preferred embodiment shown on FIG. 2*b*, a selector valve (43) is associated with each processing unit (3), so that one processing unit (3) can be moved to the work or circulation position independently of the other processing unit (3) of the machine (1). Each selector valve (43) can preferably be actuated from the tractor (T). Each selector valve (43) is of the 4-2 type, with 4 outlets and 2 positions.

Still according to the preferred embodiment shown on FIG. 2*b*, a balance valve (44) is mounted at the terminals of the or each transport cylinder (42), in particular to prevent, during transport, the weight of the or each processing unit (3) from moving it to the work position, especially if the transport cylinder (42) should accidentally be connected to the tank (R), or in case of a serious hydraulic leak.

In order to sequence the actuation of the transport (42) and lift (7) cylinders during the movements between the work and transport positions, a restriction valve (36) is mounted on the first pipe (31). Preferably, the restriction valve (36) is mounted between the intersection of the corresponding first pipe (31) with the corresponding third pipe (33) and the intersection of the corresponding first pipe (31) with the corresponding sixth pipe (46). Preferably, the restriction valve (36) is mounted on the machine (1) so as to detect whether the associated processing unit (3) is in the circulation position. When the associated processing unit (3) is not in the work position, in particular when it is in the transport or circulation position, the restriction valve (36) prevents oil from flowing from the lift (7) and tensioning (9) cylinders to a or the tank (R). When a processing unit (3) is in the work position, the restriction valve (36) allows oil to flow between the control valve (17) and the associated lift (7) and tensioning (9) cylinders. In this way, with the control valve (17) in the floating position, the machine (1) can operate with one processing unit (3) in the work position and the other processing unit (3) in the circulation position.

In the transport position of the processing units (3), the control valve (17) is in the closed configuration (as shown on FIG. 2*b*), making it possible to hold the or each lift cylinder (7) and/or the or each transport cylinder (42) in position, thus preventing accidents. In the work position of at least one processing unit (3), the control valve (17) is in the floating configuration (as shown on FIG. 2*a*), so that oil can flow from the second pipe (32) to the tank (R), thus allowing the belt (5) to slacken. In the circulation position of the processing units (3), the control valve (17) is in the closed configuration (as shown on FIG. 2*b*), so as to hold the or each lift cylinder (7) in its position.

In addition, the or each pressure control valve (11) is arranged so that it prevents oil from flowing from the first pipe (31) to the second pipe (32) when the pressure in the second pipe (32) is greater than the maximum value, regardless of the position of the processing unit (3) concerned. Similarly, the or each pressure control valve (11) is arranged so that it allows oil to flow from the first pipe (31) to the second pipe (32) when the pressure in the second pipe (32) is less than the maximum value, regardless of the position of the processing unit (3) concerned.

Preferably, in order to allow pressurization in the tensioning cylinder (9) and/or the accumulator (21), and to release the pressure in the tensioning cylinder (9) in case of excessive pressure (in the tensioning cylinder (9)), when the pressure in the second pipe (32) is less than the maximum value, the pressure control valve (11) is arranged so that it allows oil to flow in both directions (between the first pipe (31) and the second pipe (32)).

To check the pressure in the tensioning cylinder (9), a pressure-gage (34) can be connected to the second pipe (32).

Of course, the invention is not limited to the embodiment described and shown in the attached drawings. Modifications remain possible, in particular as regards the composition of the various elements or by the substitution by technical equivalents without however departing from the scope of protection of the invention.

The invention claimed is:

1. An agricultural harvesting machine intended to be moved in a direction of advance, the machine comprising:

a processing unit equipped with an endless belt conveyor, the processing unit being able to take up a work position, in which the conveyor moves a product, the belt being guided by two rollers, each roller being guided in rotation about a respective longitudinal axis, a tensioning system being associated with the belt, the tensioning system comprising an energy accumulator and a tensioning cylinder configured to vary a distance between the longitudinal axes of the two rollers, wherein a hydraulic regulating system comprising a pressure control valve is associated with the belt, which stops, in the work position of the processing unit, oil from flowing from a first pipe connecting the regulating system to a hydraulic control valve to a second pipe connecting the regulating system to the tensioning cylinder, when a pressure in the second pipe is greater than a maximum value, the pressure control valve being configured such that the regulating system allowing oil to flow from the first pipe to the second pipe when the pressure in the second pipe is less than the maximum value, and the accumulator is connected to the second pipe.

2. The agricultural machine according to claim 1, wherein a hydraulic receiver connected to the first pipe is associated with the belt.

3. The agricultural machine according to claim 2, wherein the hydraulic receiver comprises a hydraulic motor driving the belt.

4. The agricultural machine according to claim 2, wherein the hydraulic receiver comprises a lift cylinder configured to move the processing unit between the work position and a circulation position in which the conveyor is farther away from ground than in the work position.

5. The agricultural machine according to claim 1, wherein a non-return valve mounted so as to prevent oil from flowing from the second pipe to the first pipe is associated with the belt.

6. The agricultural machine according to claim 1, wherein the regulating system does not comprise a pressure limiting valve.

7. The agricultural machine according to claim 5, wherein a stop valve is mounted in parallel with the non-return valve.

8. The agricultural machine according to claim 7, wherein the at least one of the stop valve and the non-return valve is mounted between the pressure control valve and the first pipe.

9. The agricultural machine according to claim 1, wherein the tensioning cylinder is single-acting.

* * * * *